United States Patent [19]

McCain et al.

[11] 3,718,689
[45] Feb. 27, 1973

[54] PREPARATION OF TRISUBSTITUTED-HYDROXYALKYL ALKANOATES

[75] Inventors: James H. McCain; Louis F. Theiling, both of Charleston, W. Va.

[73] Assignee: Union Carbide Corporation, New York, N.Y.

[22] Filed: Feb. 10, 1972

[21] Appl. No.: 225,108

[52] U.S. Cl............260/494, 260/410.6, 260/468 R, 260/476 R, 260/499, 260/635 R, 260/643 R
[51] Int. Cl................................................C07c 67/00
[58] Field of Search........260/494, 476 R, 410.6, 468

[56] References Cited

UNITED STATES PATENTS 3,091,632   5/1963   Perry et al............................260/494
3,291,821   12/1966  Hayemeyer, Jr. et al.............260/494

*Primary Examiner*—Vivian Garner
*Attorney*—Paul A. Rose et al.

[57] ABSTRACT

A continuous process for producing high ratios of trisubstituted-hydroxyalkyl alkanoate product with relation to undesirable trisubstituted alkanediol by-product which comprises continuously subjecting, in a longitudinal-flow zone, an intimate liquid mixture comprising aldehyde and small amounts of relatively concentrated aqueous basic solution.

8 Claims, 1 Drawing Figure

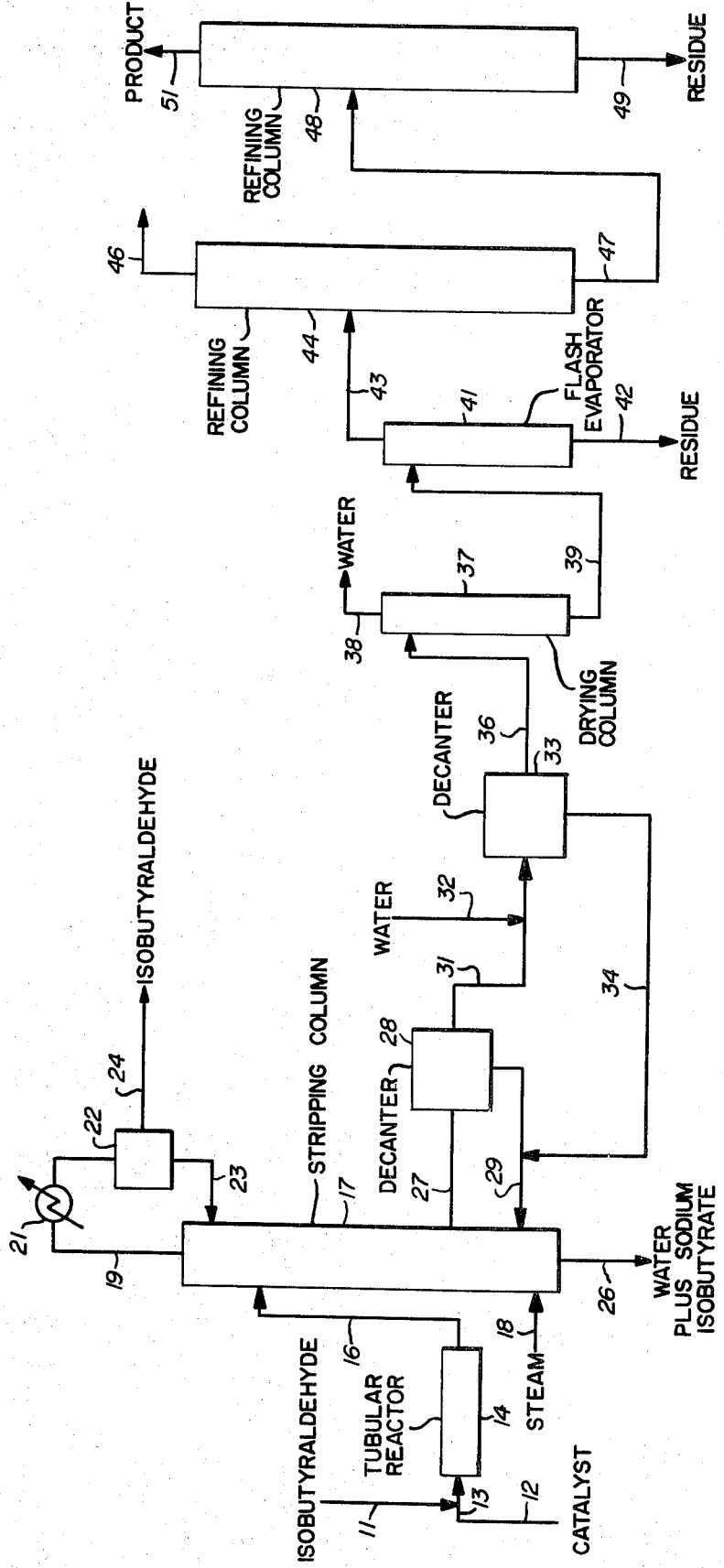

PREPARATION OF TRISUBSTITUTED-HYDROXYALKYL ALKANOATES

This invention relates to the preparation of trisubstituted-hydroxyalkyl alkanoates. In one aspect, the invention is directed to a continuous process in which aldehydic reactants having one alpha hydrogen atom are condensed to produce trisubstituted-hydroxyalkyl alkanoates.

It is disclosed in German Pat. No. 646,482 (1937) that glycol monoesters can be prepared by reacting aldehydes with solid caustic alkali or sodium amide. The disadvantages associated with using solid alkali in chemical processes are obvious. It is very difficult to accurately meter solid sodium hydroxide into a continuous chemical process. The use of a reaction zone packed with solid sodium hydroxide suffers from the disadvantage in that the process must be periodically discontinued to replenish such solid which undergoes uneven dissolution during the reaction. Solid sodium hydroxide deliquesces when exposed to air and represents a hazard to personnel handling this product.

There is also disclosed in U.S. Pat. No. 3,291,821 (1966) a heterogeneous reaction for producing glycol monoesters in which the reaction takes place, under back-mixing conditions, in a "pseudo emulsion" of aldehydic reactant and an aqueous solution of about 5 to about 20 weight percent sodium hydroxide. The patentees state that the volume of the organic phase to the volume of the aqueous phase can vary over a wide range, that is, the aqueous phase can represent from 10 to 50 volume percent, based on the total volume of organic phase and aqueous phase. The residence time, stated to be important by the patentees, is from about 15 minutes to two hours with best results being obtained in the preferred range of from about 30 minutes to one hour. A primary disadvantage of this process is the relatively high yield of diol by-product with relation to the desired glycol monoester product. For example, the use of isobutyraldehyde as the reactant in the patentees' process results in 3-hydroxy2,2,4-trimethylpentyl isobutyrate as the desired glycol monoester product, and in 2,2,4-trimethyl-1,3-pentanediol as the diol by-product. While the glycol monoester product has gained wide acceptance as a filming aid in paints the diol by-product is a commercially undesirable material. In the refining step, upwards to about two pounds of the desired glycol monoester product is lost per pound of the undesirable diol by-product by virtue of their relatively close boiling points under the refining conditions.

There has now been discovered a novel process for producing glycol monoesters (hereinafter termed "-hydroxyalkyl alkanoates") which process results in various unexpected advantages. Firstly, by the practice of the invention there is obtained quite unexpectedly, indeed, high ratios of the desired hydroxyalkyl alkanoate product with relation to the undesirable diol by-product. Such ratios are achieved while maintaining high efficiencies from the aldehydic reactant under good conversion levels. By "efficiency from aldehydic reactant," as used herein, is meant a number expressed in percent which is determined by the total number of moles of hydroxyalkyl alkanoate product produced from the aldehydic reactant during the condensation reaction divided by the number of moles of aldehydic reactant consumed during the condensation reaction, multiplied by 100. Secondly, in the practice of preferred embodiments of the invention productivities can be achieved which differ from prior art processes by an order of magnitude, that is to say, productivities are obtained which represent an increase of upwards to about 100 percent, and higher, over the prior art two-liquid phase reaction. By the term "productivity", as used herein, is meant the amount by weight of hydroxyalkyl alkanoate product which is produced in a unit of time per unit of reactor volume. Again using isobutyraldehyde as the illustrative reactant, the productivity can be expressed as the number of pounds of 3-hydroxy-2,2,4-trimethylpentyl isobutyrate product produced per hour per cubic foot of reactor volume.

In the practice of the invention, trisubstituted-hydroxyalkyl alkanoates are prepared via a process which comprises:

i. continuously subjecting, in a longitudinal-flow zone,
ii. an intimate mixture comprising an aldehyde which has one alpha hydrogen atom and from about 0.5 to about 5 weight percent, based on the weight of said aldehyde, of an aqueous solution of a strong base, e.g., alkali metal hydroxides or alkaline earth metal hydroxides;
iii. the concentration of said strong base in said aqueous solution being at least about 30 weight percent, based on the total weight of said aqueous solution;
iv. at a temperature in the range of from about 50° C. to about 150° C.;
v. for a period of time at least sufficient to produce a reaction product mixture rich in hydroxyalkyl alkanoate product;
vi. withdrawing from said zone said reaction product mixture rich in hydroxyalkyl alkanoate product; and
vii. recovering said hydroxyalkyl alkanoate product therefrom.

The novel process can be represented by the following equation:

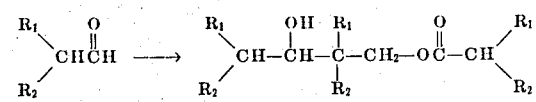

wherein $R_1$ and $R_2$, individually, represent the same or different monovalent hydrocarbon radicals, e.g., alkyl, cycloalkyl, aryl, etc. Desirably, the total number number of carbon atoms in $R_1$ plus $R_2$ equals 2 to 10. Representative $R_1$ and $R_2$ radicals include, by way of illustrations, methyl, ethyl, n-propyl, isopropyl, n-butyl, n-hexyl, 2-ethylhexyl, cyclohexyl, cyclo-pentyl, phenyl, benzyl, tolyl, phenethyl, and the like. Preferably, $R_1$ and $R_2$ represent lower alkyl, e.g., methyl, ethyl, n-propyl, isopropyl, and the butyls.

The aldehydes which are particularly useful as reactants in the novel process are $C_4$—$C_{12}$ aldehydes which contain one hydrogen atom on the carbon atom which is positioned alpha to the aldehydic group

Such reactants are also known as aldehydes which have one alpha hydrogen atom and include, for example, isobutyraldehyde, alpha-methylvaleraldehyde, alpha-methylcaproaldehyde, alpha-ethylbutyraldehyde, alpha-ethylcaproaldehyde, 2-methylheptanal, 2-ethyloctanal, alpha-phenylpropionaldehyde, alpha-cyclohexylpropionaldehyde, alpha-phenylbutyraldehyde, and the like. Isobutyraldehyde represents the preferred reactant. It is desirable to use high purity aldehydic reactant in the novel process. Aldehydes having maximum levels of about 0.5 weight percent alkanoic acid and about 0.5 weight percent water are suitable in the practice of the invention. It is to be understood, however, that higher levels of acid and/or water can be tolerated.

The strong bases which are suitable in the novel process include the alkali metal hydroxides such as, for example, sodium hydroxide, lithium hydroxide, potassium hydroxide, magnesium hydroxide, and the like. From standpoints of economy, availability, and effectiveness in the novel process, sodium hydroxide is preferred.

It is necessary to intimately mix the aldehydic reactant and the relatively small amount of the aqueous basic solution. The low ratio of diol by-product to hydroxyalkyl alkanoate product has been observed by employing a reaction mixture which does not exceed approximately 5 weight percent of aqueous basic solution, based on the aldehydic reactant. Highly satisfactory results are obtained by using a reaction mixture comprising from about 0.5 to about 5 weight percent of aqueous basic solution, based on the aldehydic reactant. The maximum quantity of aqueous basic solution relative to aldehydic reactant which is employed in preferred embodiments of the novel process does not exceed that concentration where the intimately mixed reaction mixture ceases to be homogeneous. By "homogeneous" is meant that separation into two liquid layers or phases does not occur on standing for several hours. This factor of homogeneity is readily determined by periodically withdrawing reaction mixture from the reaction zone and ascertaining whether separation into two liquid phases occurs. By way of illustration, it has been observed in the practice of a preferred embodiment of the invention that the reaction of 100 parts by weight of isobutyraldehyde in the presence of 2 parts by weight of aqueous sodium hydroxide solution (50 weight percent NaOH concentration), in a longitudinal-flow zone, for example, a tubular reactor or packed column, at 80° C. and 15 psig for a period of about 5 minutes gave a reaction product mixture which was homogeneous on standing for one week, i.e., it did not separate into two liquid phases though some cloudiness was observed. In most cases it is preferred to operate the novel process with a homogeneous reaction mixture comprising up to approximately 3 weight percent of aqueous basic solution, e.g., from about 0.5 to about 3 weight percent, based on the aldehydic reactant.

The correlation of such factors as longitudinal-flow, the use of small quantities of a relatively concentrated aqueous solution of a strong base, etc., results in a novel process which gives high ratios of desired trisubstituted-hydroxyalkyl alkanoate product to undesirable diol by-product. In the practice of preferred embodiments of the invention the novel process gives high productivities of such desired product heretofore not obtained by prior art processes.

The concentration of metal hydroxide in aqueous solution is considered to be quite important. As the concentration decreases below the minimum limit the conversion of aldehydic reactant to hydroxyalkyl alkanoate diminishes significantly. Consequently, the minimum concentration of metal hydroxide in the aqueous solution which is employed under the controlled operative conditions of the novel process is at least about 30 weight percent (based on the weight of the aqueous basic solution), and preferably at least about 40 weight percent. The upper limit is quite important also and it should not exceed that point where the resulting aqueous basic solution ceases to be liquid at ambient temperature, i.e., about 22° C. An aqueous solution of metal hydroxide in which the concentration of metal hydroxide is about 60 weight percent represents a preferred upper limit.

The condensation reaction is conducted for a period of time at least sufficient to produce a reaction product mixture rich in hydroxyalkyl alkanoate product. In general, a residence period up to about two hours gives satisfactory results. However, marked increases in productivity are obtained by maintaining a maximum residence period up to approximately ten minutes, e.g., from about one to 10 minutes. Moreover, such productivities are realized without sacrificing either conversion or efficiency.

The condensation reaction is effected at an elevated temperature. A suitable temperature range is from about 50° C. to about 150° C. In the practice of preferred embodiments of the invention a temperature of from about 60° C. to about 100° C. is employed. Pressures are not critical and satisfactory results are obtained by using atmospheric pressure or moderately superatmospheric pressure, e.g., about one to 10 atmospheres.

The reaction product mixture or effluent from the longitudinal-flow zone comprises the desired hydroxyalkyl alkanoate product, some alkanediol byproduct, aldehyde mostly in the form of its trimer, and small amounts of other by-products such as diesters. Desirably, the effluent can be introduced into a steam stripping column maintained at about 125° C. and moderate pressure, e.g., 2 atmospheres, in which the trimer reverts to the aldehyde monomeric form. The aldehyde is then recovered overhead as an azeotrope with water. An aqueous stream containing dissolved salts therein, e.g., sodium alkanoate, is removed as a bottoms stream from the stripping column and discarded. A condensate comprising hydroxyalkyl alkanoate product, alkanediol product, water, etc., is allowed to separate into an upper organic phase and a lower aqueous phase. The organic phase is then recovered, washed one or more times with water, allowed to again separate into two phases, and from the organic phase the desired hydroxyalkyl alkanoate product can be recovered therefrom via conventional means, e.g., fractional distillation.

The novel process can be more fully understood by reference to the drawing which is a schematic flow diagram of a continuous system for carrying out a suitable embodiment of the invention.

Referring now to the drawing, isobutyraldehyde is continuously introduced into line 11 where it is joined by 50 weight percent aqueous sodium hydroxide solution, as the catalyst, continuously introduced into the system via line 12. The feed rates of isobutyraldehyde reactant and catalyst solution are adjusted so as to maintain a two weight percent aqueous sodium hydroxide solution (50 weight percent concentration), based on the isobutyraldehyde feed. The resulting mixture flows through line 13 into tubular reactor 14 which is maintained at about 80° C. and a pressure of about 15 psig. The residence period in tubular reactor 14 is about 5 minutes. The effluent from tubular reactor 14 is withdrawn via line 16 and is introduced into the upper portion of stripping column 17. Steam is introduced into the lower portion of stripping column 17 via line 18. Under the operative conditions maintained in stripping column 17 isobutyraldehyde trimer reverts to isobutyraldehyde monomer, and the desired hydroxy ester product, i.e., 3-hydroxy-2,2,4-trimethylpentyl isobutyrate, and unreacted isobutyraldehyde are readily separated. An azeotrope of isobutyraldehyde and water is taken overhead via line 19 through condenser 21 into separator 22. The aqueous phase containing dissolved isobutyraldehyde is returned to stripping column 17 via line 23 for refluxing. Isobutyraldehyde is withdrawn via line 24, and though not shown, is dried, and recycled to tubular reactor 14 via line 11. An aqueous stream containing sodium isobutyrate is withdrawn from stripping column 17 via line 26 and discarded. The condensate comprising substantial quantities of 3-hydroxy-2,2,4-trimethylpentyl isobutyrate, small amounts of 2,2,4-trimethyl-1,3-pentanediol (hereinafter called, for convenience, the "hydroxy ester product" and "diol by-product," respectively), and water, is withdrawn via line 27 and introduced into decanter 28 where there is formed an upper organic phase comprising hydroxy ester product and diol by-product and a lower aqueous phase containing small amounts of hydroxy ester product. The aqueous phase is recycled to stripping column 17 via line 29 for recovery of the hydroxy ester product therefrom. The organic phase is withdrawn from decanter 28 via line 31, is washed with water in in-line mixer 32, and the resulting wash-mixture is introduced into decanter 33. In-line mixer 32 and decanter 33, in effect, comprise a washing operation to further reduce the amount of salts, e.g., sodium isobutyrate, dissolved in the organic phase. Wash water is withdrawn from decanter 33 and introduced into stripping column 17 via line 34 and line 29. The washed organic phase is withdrawn from decanter 33 via line 36 into drying column 37. Water and any low boilers are removed overhead from drying column 37 and discarded via line 38. A bottom fraction comprising hydroxy ester product, diol by-product, etc., are removed from drying column 37 and introduced into flash evaporator 41 via line 39. Small amounts of residues comprising 2,2,4-trimethyl-1,3-di(iso-butanoyloxy)pentane are removed from flash evaporator 41 via line 42. A fraction comprising principally hydroxy ester product and diol by-product are withdrawn from flash evaporator 41 and introduced into a first refining column 44 via line 43. An intermediate fraction comprising diol by-product and hydroxy ester product are withdrawn from refining column 44 via line 46 and, if desired, further processed to recover the hydroxy ester product therefrom. A bottoms stream containing the main portion of hydroxy ester product and very small quantities of residue materials are withdrawn from the first refining column 44 and introduced into a second refining column 48 via line 47. Purified hydroxy ester product is withdrawn via line 51 and a small quantity of residue materials is removed via line 49 from the second refining column 48.

In the illustrative Examples, the isobutyraldehyde feed contained a maximum of about 0.36 weight percent acid (calculated as acetic acid) and a maximum of about 0.1 weight percent water except for Examples 7-8. In these two Examples the water content in the isobutyraldehyde feed was 1.5 weight percent (Example 7) and 2.5 weight percent (Example 8).

EXAMPLE 1

A 2.4 cm. diameter by 30 cm. long glass tube was packed with 100 grams of potassium hydroxide pellets. Isobutyraldehyde which contained 0.36 weight percent acid (calculated as acetic acid) and 0.12 weight percent water was fed through the tube at a rate of 400 cc/hour. The reaction in the packed potassium hydroxide column was uneven, and the temperature varied between about 70° C. and 85° C. over the 2.5 hour feed period. The residence time was approximately 10 minutes. Vapor phase chromatography of the effluent confirmed the presence of 54 weight percent unreacted isobutyraldehyde, 40 weight percent 3-hydroxy-2,2,4-trimethylpentyl isobutyrate, 4.7 weight percent 2,2,4-trimethyl-1,3-pentanediol, and 1.2 weight percent 2,2,4-trimethyl-1,3-diisobutanoyloxypentane. The ratio 2,2,4-trimethyl-1,3-pentanediol by-product to 3-hydroxy-2,2,4-trimethylpentyl isobutyrate product was 12 percent.

EXAMPLE 2

The reactor was a 1-liter, 4-necked reaction flask equipped with a stirrer, thermometer, condenser and a two-feed adapter. Isobutyraldehyde which contained 0.36 weight percent acid (calculated as acetic acid) and 0.12 weight percent water was fed to the reactor at 500 cc/hour. Aqueous sodium hydroxide (50 weight percent NaOH concentration) was introduced simultaneously into the reactor at a rate of 12 cc/hour. The temperature in the reactor was maintained at about 80° C. After the reactor had filled, a constant takeoff was begun, and a residence period of one hour was maintained. Forty-five minutes after the takeoff was started a sample of the effluent was analyzed (Sample 1). At that time, the sodium hydroxide feed rate was decreased to 6 cc/hour, and the reaction was continued. After 1.5 hours of reaction, a sample of the effluent was again analyzed (Sample 2). The sodium hydroxide feed rate was then increased back to 12 cc/hour, and 1.5 hours later a sample of the effluent was again analyzed (Sample 3). The data in Table I below disclose that the ratio of 2,2,4-trimethyl-1,3-pentanediol byproduct to 3-hydroxy-2,2,4-trimethylpentyl isobutyrate product in Samples 2 and 3 was extremely high. In Sample 1, this ratio was quite lower probably because the reactor had not come to equilibrium. The ratio of diol by-product to hydroxyalkyl alkanoate product in the total effluent was in excess of 35 percent. The data is shown in Table I below.

TABLE I

| Sample Number | Unreacted Isobutyraldehyde | Diol by-product (1) | Ester product (2) | Diester by-product (3) | ratio of diol/ester %(4) |
|---|---|---|---|---|---|
| 1 | 32 | 4.9 | 63 | 0.1 | 7.8 |
| 2 | 57 | 22 | 21 | 0.2 | 104 |
| 3 | 34 | 15 | 46 | 3.9 | 33 |

(1) 2,2,4-Trimethyl-1,3-pentanediol (expressed as weight percent)
(2) 3-Hydroxy-2,2,4-trimethylphentyl isobutyrate (expressed as weight percent)
(3) 2,2,4-Trimethyl-1,3-diisobutanoyloxypentane (expressed as weight percent)
(4) Ratio of 2,2,4-trimethyl-1,3-pentanediol by-product to 3-hydroxy-2,2,4-trimethylpentyl isobutyrate product

EXAMPLES 3–11

Nine experiments were conducted as follows. The tubular reactor was a 20 foot by 0.25 inch OD (outside diameter) piece of 304 stainless steel tubing coiled in a helix. The volume inside the reactor was 110 cc. The tubular reactor was attached with a short length of PVC tubing to a glass mixing zone which was provided with mixing means. The mixing zone was enclosed except for two inlet tubes and an outlet tube. The volume of this zone was approximately 5 cc. The tubular reactor was immersed in a water bath thermostated at about 75° C. Isobutyraldehyde was fed to the mixing zone at 1,000 cc/hour. The feed of aqueous sodium hydroxide solution was varied. The residence time was approximately 6 minutes. In those cases where the aqueous solution contained 50 weight percent sodium hydroxide, the exotherm resulting from the initial reaction of isobutyraldehyde in the presence of sodium hydroxide raised the temperature inside the mixing zone to about 55° C. The tubular reaction zone was maintained at atmospheric pressure. At the end of the reaction period the effluent was collected. Vapor phase chromatography confirmed the presence of the major components therein. Additional data are set forth in Table II below.

TABLE II

| Example Number [1] | Aqueous NaOH solution [2] | Aqueous NaOH solution/ aldehyde, percent [3] | Total feed period, min. | Unreacted aldehyde, wt. percent | Diol by-product, wt. percent [4] | Ester product, wt. percent [5] | Ratio of diol/ester, percent [6] |
|---|---|---|---|---|---|---|---|
| 3 | 50 | 2.0 | 180 | 55 | 2.0 | 41 | 5.0 |
| 4 | 50 | 2.4 | 20 | 36 | 2.5 | 61 | 4.1 |
| 5 | 50 | 2.4 | 20 | 51 | 2.7 | 45 | 6.0 |
| 6 | 50 | 2.4 | 20 | 70 | 0.9 | 29 | 3.0 |
| 7 | 50 | 2.4 | 20 | 46 | 2.8 | 51 | 5.5 |
| 8 | 50 | 2.4 | 13 | 63 | 1.8 | 34 | 5.4 |
| 9 | 10 | 27.0 | 25 | 99 | 0.0 | 1.2 | |
| 10 | 50 | 1.1 | 75 | 75 | 0.6 | 25 | 2.4 |
| 11 | 50 | 1.9 | 75 | 53 | 1.9 | 45 | 4.1 |

[1] In examples 7 and 8, isobutyraldehyde feed contained about 1.5 weight percent and 2.5 weight percent water.
[2] Weight percent NaOH in the aqueous solution.
[3] Ratio of aqueous sodium hydroxide solution/isobutyraldehyde.
[4] 2,2,4-trimethyl-1,3-pentanediol.
[5] 3-hydroxy-2,2,4-trimethylpentyl isobutyrate.
[6] Ratio of 2,2,4-trimethyl-1,3-pentanediol by-product/3-hydroxy-2,2,4-trimethylpentyl isobutyrate product.

EXAMPLES 12–14

These experiments were conducted as follows. The tubular reactor was a 1.25 inch OD by 21 inch long glass tube equipped with a stopcock on the bottom, two inlet tubes one inch from the top, and a joint at the top to which a condenser was affixed. The tubular reactor was filled to within 2 inches of the top with 3/16 inch diameter glass beads giving it a liquid capacity of 100 cc. Thermometers inserted in the column measured the temperature at the upper and lower portions of the reaction mixture. The reaction temperature at the bottom of the reactor was 72°–76° C. In general, the temperature at the top was about 5° C. lower than that at the bottom. Isobutyraldehyde was introduced into the reactor at a feed rate of 1000 cc/hour. The feed of aqueous sodium hydroxide solution was varied. The residence time was approximately 6 minutes. The reaction zone was maintained at atmospheric pressure. At the end of the reaction period the effluent was collected. Vapor phase chromatography confirmed the presence of the major components therein. Additional data are set forth in Table III below.

TABLE III

| Example Number | Aqueous NaOH solution [1] | Aqueous NaOH solution/ aldehyde, percent [2] | Total feed period, min. | Unreacted aldehyde, wt. percent | Diol by-product, wt. percent [3] | Ester product, wt. percent [4] | Ratio of diol/ester, percent [5] |
|---|---|---|---|---|---|---|---|
| 12 | 50 | 2.6 | 60 | 53 | 2.5 | 45 | 5.7 |
| 13 | 50 | 2.4 | 40 | 39 | 3.2 | 50 | 6.5 |
| 14 | 30 | 3.5 | 50 | 63 | 1.5 | 31 | 4.8 |

[1] Weight percent NaOH in the aqueous solution.
[2] Ratio of aqueous sodium hydroxide solution/isobutyraldehyde.
[3] 2,2,4-trimethyl-1,3-pentanediol.
[4] 3-hydroxy-2,2,4-trimethylpentyl isobutyrate.
[5] Ratio of 2,2,4-trimethyl-1,3-pentanediol by-product/3-hydroxy-2,2,4-trimethylpentyl sobutyrate product.

What is claimed is:

1. A process for producing a hydroxyalkyl alkanoate which comprises:

i. continuously subjecting, in a longitudinal-flow zone, ii. an intimate mixture comprising an aldehyde of the formula:

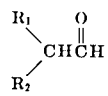

wherein $R_1$ and $R_2$ are monovalent hydrocarbon radicals and the total number of carbon atoms in $R_1$ and $R_2$ is 2–10 which has one alpha hydrogen atom and from about 0.5 to about 5 weight percent, based on the weight of said aldehyde, of an aqueous solution of a strong base of the group consisting of alkali metal hydroxides or alkaline earth metal hydroxides;

iii. the concentration of said strong base in said aqueous solution being at least about 30 weight percent, based on the total weight of said aqueous solution;

iv. at a temperature in the range of from about 50° C. to about 150° C;

v. for a residence period of up to 2 hours sufficient to produce a reaction product mixture rich in hydroxyalkyl alkanoate product;

vi. withdrawing from said zone said reaction product mixture rich in hydroxyalkyl alkanoate product; and vii. recovering said hydroxyalkyl alkanoate product therefrom.

2. The process of claim 1 wherein said strong base is an alkali metal hydroxide.

3. The process of claim 2 wherein said alkali metal hydroxide is sodium hydroxide.

4. The process of claim 3 wherein said temperature is in the range of from about 60° C. to about 100° C.

5. The process of claim 4 wherein a homogeneous mixture comprising up to approximately 3 weight percent of an aqueous sodium hydroxide solution, based on the weight of said aldehyde, is employed.

6. The process of claim 5 wherein said aqueous sodium hydroxide solution contains from about 40 to about 60 weight percent therein.

7. The process of claim 6 wherein the residence period does not exceed approximately ten minutes.

8. The process of claim 6 wherein said aldehyde is isobutyraldehyde and wherein said hydroxyalkyl alkanoate product is 3-hydroxy-2,2,4-trimethylpentyl isobutyrate.

* * * * *